(12) United States Patent
Libes et al.

(10) Patent No.: US 7,979,461 B2
(45) Date of Patent: Jul. 12, 2011

(54) EXTENDED INDEX SEARCHING

(75) Inventors: Michael Libes, Bainbridge, WA (US); Nicolas Pottier, Seattle, WA (US)

(73) Assignee: Medio Systems, Inc., Seattle, WA (US)

( * ) Notice: Subject to any disclaimer, the term of this patent is extended or adjusted under 35 U.S.C. 154(b) by 412 days.

(21) Appl. No.: 11/675,514

(22) Filed: Feb. 15, 2007

(65) Prior Publication Data

US 2008/0201301 A1    Aug. 21, 2008

(51) Int. Cl.
*G06F 17/30* (2006.01)

(52) U.S. Cl. ........ 707/770; 707/706; 707/713; 707/722; 707/758

(58) Field of Classification Search .................. None
See application file for complete search history.

(56) References Cited

U.S. PATENT DOCUMENTS

| | | | |
|---|---|---|---|
| 6,345,253 B1 * | 2/2002 | Viswanathan | 704/272 |
| 6,671,681 B1 * | 12/2003 | Emens et al. | 1/1 |
| 6,920,459 B2 * | 7/2005 | Dedhia et al. | 707/740 |
| 6,950,821 B2 * | 9/2005 | Faybishenko et al. | 707/688 |
| 7,084,737 B1 * | 8/2006 | Moore et al. | 340/5.91 |
| 7,092,936 B1 * | 8/2006 | Alonso et al. | 1/1 |
| 7,174,346 B1 * | 2/2007 | Gharachorloo et al. | 707/102 |
| 7,343,371 B2 * | 3/2008 | Ibuki et al. | 707/4 |
| 7,440,964 B2 * | 10/2008 | Gosse et al. | 707/102 |
| 7,526,476 B2 * | 4/2009 | Naam et al. | 1/1 |
| 7,653,614 B2 * | 1/2010 | Smith | 707/769 |
| 2003/0182277 A1 | 9/2003 | Kurakake | |
| 2003/0200157 A1 | 10/2003 | Krajec | |
| 2005/0193002 A1 * | 9/2005 | Souders et al. | 707/103 X |
| 2005/0234871 A1 * | 10/2005 | Martin et al. | 707/3 |
| 2006/0206475 A1 * | 9/2006 | Naam et al. | 707/5 |
| 2006/0271524 A1 | 11/2006 | Tanne | |
| 2008/0201287 A1 * | 8/2008 | Takeuchi | 706/46 |
| 2009/0019066 A1 * | 1/2009 | Wang et al. | 707/100 |
| 2009/0216746 A1 * | 8/2009 | Aubin et al. | 707/5 |

OTHER PUBLICATIONS

Dirk Bahle et al, "Efficient Phrase Querying with an Auxiliary Index", School of Computer Science and Information Technology, Tampere, Finland, 2002, pp. 215-222.*

Paul M. Aoki, "Implementation of Extended Indexes in POSTGRES", Computer Science Division Department of EECS, University of California, 2001.*

* cited by examiner

*Primary Examiner* — Apu M Mofiz
*Assistant Examiner* — Hung D Le
(74) *Attorney, Agent, or Firm* — Kilpatrick Townsend & Stockton LLP (57) ABSTRACT

Processing a query involves directing the query to an extended index database, the extended index database comprising a core database and one or more supplemental indexes, wherein the query seeks an item. Directing the query for processing includes determining if the sought item is located within the core database and, if the item is not determined to be located in the core database, then determining if the item is located in one or more of the supplemental indexes, and returns a query result. The returned result may comprise any one of three responses, including a response that indicates the item is located in the core database, or a response that indicates that the item was not located in the core database but was located in one or more of the supplemental indexes, or a response that indicates that the item was not located at all.

15 Claims, 6 Drawing Sheets

FIGURE 1A

PRIOR ART

FIGURE 1B

PRIOR ART

FIGURE 1C

PRIOR ART

EXTENDED INDEX SEARCHING

BACKGROUND OF THE INVENTION

Researchers and librarians have been organizing information into indices for many thousands of years. The Library of Alexandria over 2000 years ago included an index of the information found in their hundreds of thousands of scrolls. Up until a few decades ago, the Library of Congress included a card catalog indexing the titles, authors, and categories of each of their millions of books and other media. Today, public libraries nearly always include a computerized, searchable book database.

Similarly, in the last century, corporations have created indices of their information relating to the goods and services they offer. Walmart has an index of massive size that includes every product they sell, linked to an inventory management database showing how many of those products are sitting on each store shelf. Amazon.com sells more products than Walmart, and the Amazon.com Web site includes an index of all these product offerings. A customer can search the Amazon.com index to find a desired product offering.

Finally, companies such as Google and Yahoo! have a primary focus to make all information searchable via their respective proprietary indexes, each covering tens of billions of Web sites, product databases, and other informational sources. A visitor to either of these Web sites can input a query that is directed to the Web site index.

The one constant characteristic throughout all the search systems described above is that it is only possible to find items that exist in the library or database. That is, when performing a search that is supported by any of these indexes, the search is directed only to the particular one of the indexes in question. When searching for something beyond the particular index in question, the result is always null. A null search result is not especially helpful.

It should be apparent that the resource search and location experience would be improved if the resources and network conditions over which search is performed could be enlarged. The present invention satisfies this need.

SUMMARY

A technique for processing a query directs the query to an extended index database, the extended index database comprising a core database and one or more supplemental indexes, wherein the query seeks an item and directing the query includes determining if the sought item is located within the core database and, if the item is not determined to be located in the core database, then determining if the item is located in one or more of the supplemental indexes, and returning a query result. The returned result may comprise any one of three responses, including a response that indicates the item is located in the core database, or a response that indicates that the item was not located in the core database but was located in one or more of the supplemental indexes, or a response that indicates that the item was not located at all. In this way, the technique utilizes an extended index search and provides an improved resource search and location experience.

Other features and advantages of the present invention should be apparent from the following description of the preferred embodiments, which illustrate, by way of example, the principles of the invention.

DETAILED DESCRIPTION

The invention provides a technique for using a large index as the basis for searching a small number of items.

In FIGS. 1A, 1B, 1C, 2, 5A, 5B, 5C, and 6, a person is seeking a specific item by performing a search on an index. The index being searched can be a card catalog, an online database, or an index as large as the indices maintained by Yahoo! and Google. The techniques of FIGS. 1A, 1B, 1C, and 2 involve prior art techniques. A reference to "FIG. 1" is meant to apply to FIGS. 1A, 1B, and 1C, collectively.

Figure 1A:
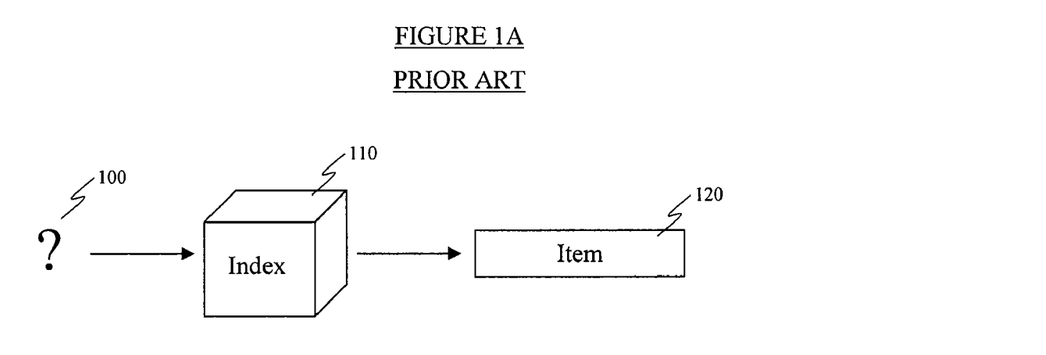
FIG. 1A is a flow diagram that illustrates performing a query operation that returns a single item.
Figure 1B:
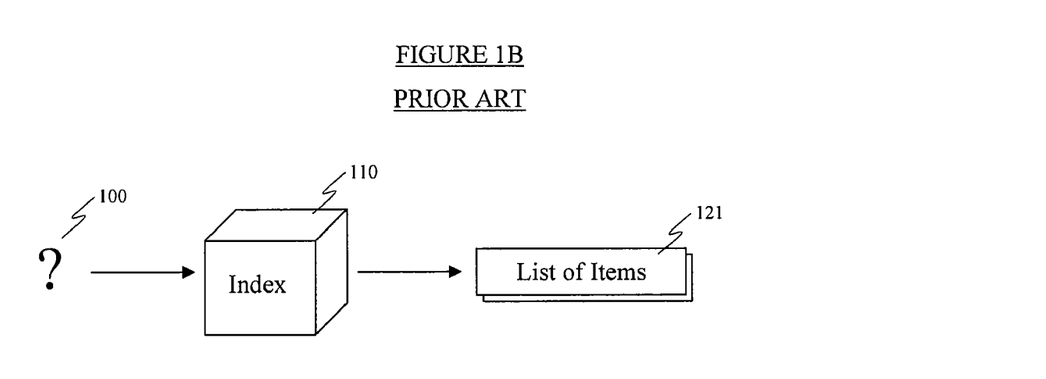
FIG. 1B is a flow diagram that illustrates performing a query operation into an index returning a list of items.
Figure 1C:
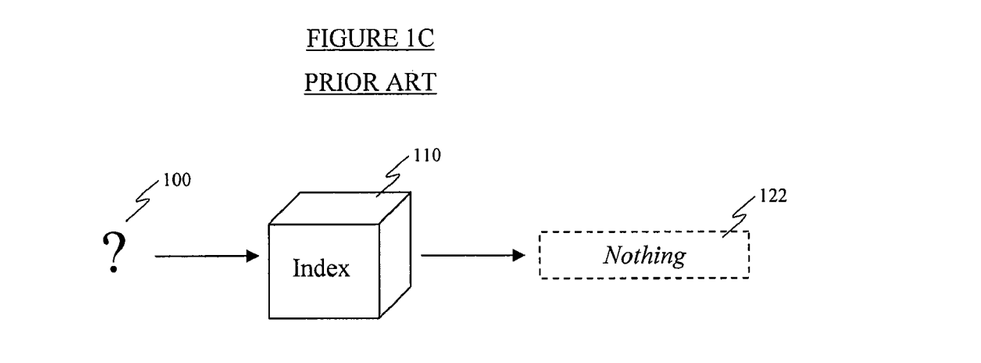
FIG. 1C is a flow diagram that illustrates performing a query into an index returning no items.

FIGS. 1A, 1B, and 1C represent conventional database searches in which a query 100 is submitted and responses are sought from within a search index 110. If an item in the index 110 is found to match the query, then in FIG. 1A, the matched item 120 is returned from the index as the output of the search. Sometimes, more than one match in the index is found. In FIG. 1B, a list of the multiple matched items 121 is returned as the search output. Another case is that no matches are found. In FIG. 1C, no items 123 are returned from the index. In the case of a card catalog or paper index, this is represented by a failure to find any matches within the index. In a computerized index, this "null" match is usually represented by an agreed-upon symbol.

Figure 2:
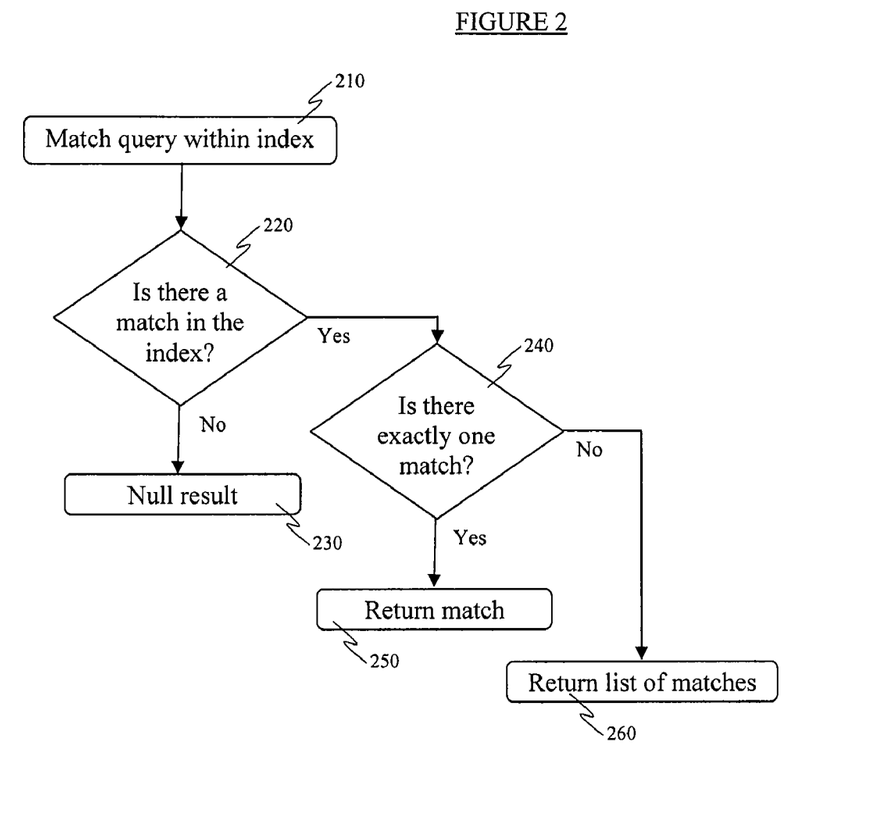
FIG. 2 is a flow diagram that shows the cases from FIGS. 1A, 1B, and 1C.

The flow of the FIG. 1 search operations is illustrated in FIG. 2. The query 100 is matched in the index at the first operation, step 210. If there are no matches, a negative outcome at the matching operation 220, then in step 230, the null result 122 (see FIG. 1C) is returned. If there are matches, an affirmative outcome at 220, then if there is exactly one match 240, the single item 120 (see FIG. 1A) is returned at step 250. Otherwise, there must be more than one match, and the list of items 121 (see FIG. 1B) is returned at step 260.

In the two cases listed for FIGS. 1A and 1B (represented as steps 250 and 260 from FIG. 2), it is possible that the methods used to match the query 100 within the index 110 may return items that do not in fact match what the person is seeking. This could be due to having multiple items in the index with identical names as sought in the query, or may be due to a matching method that uses heuristics rather than strict comparisons. It should be noted that the present invention is not directed to solving such index item naming failures and inadequate search schemes. Rather, for the description herein, it is assumed that matches returned from the index will match the expectations of the person issuing the query.

Figure 3:
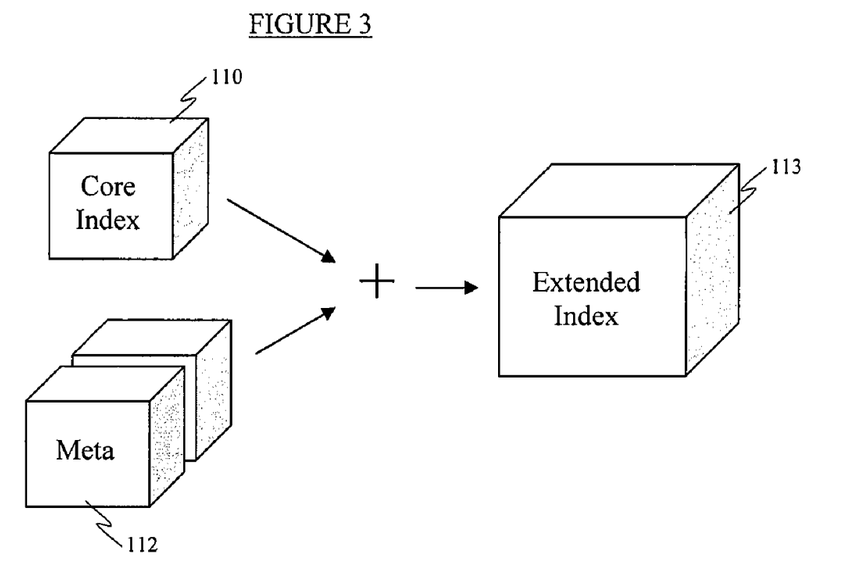
FIG. 3 is a diagrammatic illustration of creating an extended index in accordance with the invention.

FIG. 3 illustrates how an extended index in accordance with the invention is created. A core index, such as the index 110 described above, is combined with one or more additional indexes 112 (referred to herein as meta indexes or supplemental indexes) to comprise an extended index 113 such that both indexes 110, 112 remain distinct but can be searched against by the same query. For example, a city library could form an extended index comprising its core index of a card catalog for its book collection combined with a supplemental index comprising the full U.S. Library of Congress index of books 112. A user can then submit a query for a book, and the result will be returned after a search across both indexes. In keeping the city library card catalog and Library of Congress index distinct but searchable, it is necessary to note which books are included within the original core index 110 and which are only included in the supplemental index 112.

Another example of a suitable extended index 113 would be for a vendor such as Amazon.com to create an "extended" index of movies, comprising their existing core index of DVDs available for purchase through Amazon.com with a meta index list from a source such as the Internet Movie Database (IMDb) of historical movies. Queries against entries in the extended index 113 would return results that denote which movies are available from Amazon.com on DVD and which are not. Thus, a user of such an extended Amazon.com index would be informed about DVD releases available at Amazon.com and would be provided information about movie titles including those that have been released on DVD but that are simply not available at the Amazon.com site.

In a suitable computer implementation of the extended index, the core index database and the supplemental index may be kept distinct but searchable by the same query through appropriate operation of a search engine computer that receives the query. Such a search engine computer will have access to the core index and the supplemental index, but it is not required that both indexes be located at the same computer or network node. Rather, it is sufficient if the search engine computer has access to both indexes so it can perform the searches. In this way, the single search engine computer can receive the query and direct it (i.e., apply it) against the extended index database combining the core index and the supplemental indexes. The single computer executing the search can thereby provide efficient operation and faster response times as compared with multiple serial or parallel search operations by multiple computers.

Figure 4:
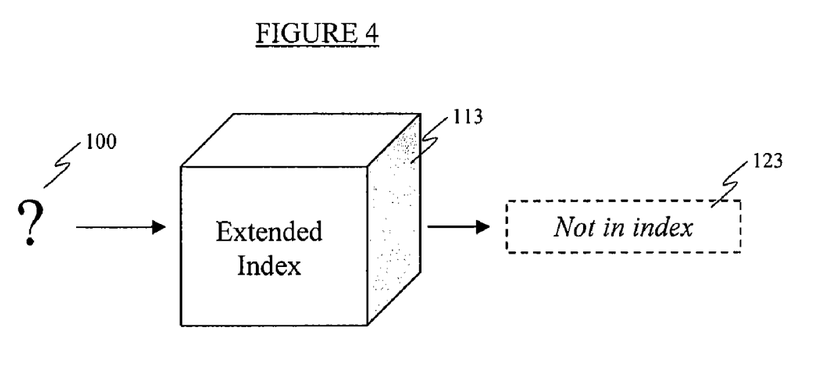
FIG. 4 is a flow diagram that illustrates the result of operating on a query to return an item not in the original index.

The extended index construction shown in FIG. 3 creates an extended index 113 that can provide a new type of result, as illustrated in FIG. 4. In this diagram, the query is matched against an extended index 113 instead of only the core index 110 (see FIG. 1A, 1B, 1C). With the availability of the extended index, in a search that would otherwise produce a null result, such as the search case from FIG. 1C where there were no matches in the core index 110, a search using the extended index will determine when there is at least one match from the extended index 113. In this scenario, the returned search result can be a message 123 representing, "Sorry, the item exists, but it is not available in the original index". This result provides the valuable information that the searched item (such as a product or resource) is not available in the core index from which the item was sought, but does exist (is available) elsewhere. Continuing with the DVD movie example, the extended search responds to the query by providing the information that the movie is not available from the searched site, but has been released on DVD. The case remains where no matches are found anywhere in the extended index 113, but the larger the extended index, the less likely this result.

This type of result is useful. When no matches were found in the conventional operation illustrated in FIG. 1C, the person did not know whether the flaw or failing that caused a "no match" result 122 was in the index 110 or in processing the query 100. With the "not in core index" result 123 of FIG. 3, the flaw is clearly within the core index 110. That is, the person still has no matches, but now has the knowledge that this item is not available within the core index but exists, in that it is available or present in another index. Thus, the person can seek the item elsewhere or seek another item via another query.

Figure 5:
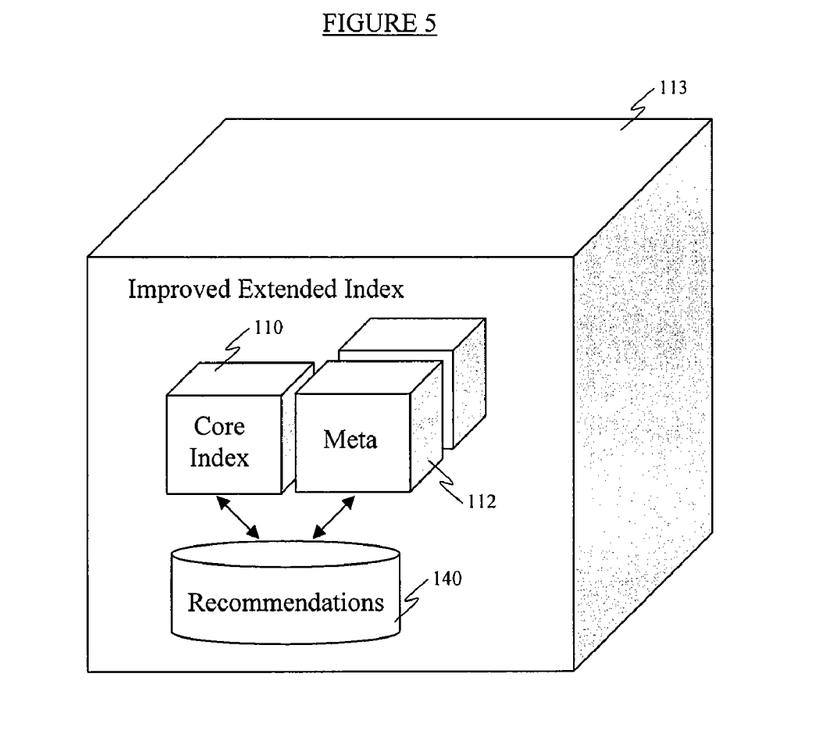
FIG. 5 is a diagrammatic view of creation of the components with an improved extended index system.

FIG. 5 diagrams the components within an extended index 113 for an alternative embodiment of an extended index in accordance with the present invention. In addition to the combined core index with additional meta indexes (supplemental indexes) as described previously, FIG. 5 shows a new component 140 can be added that includes relations between items in these indexes. This type of extended index will be referred to as a "recommendations" index. The recommendations index is for identifying similar items that are not identical to or matches with the sought item, but rather are alternate search terms (alternate query items), or similar items, that might be suitable replacements for the item being sought (i.e., the item that is the subject of the search query).

It is not uncommon to find a core index 110 that is tied to one or more recommendation indexes. For example, Amazon.com is well-known for their use of such recommendations. It should be noted that the present invention is not directed to such conventional processes. Rather, the present invention relates to providing an extended index and producing recommendations 140 for search items that are not located in the core index 110.

Having such a recommendation index 140 within the improved extended index 113 provides an additional type of search result. This is diagrammed in FIG. 6. In this case, if no matches are found within the core index, rather than simply returning a "not in original index, but item exists" response 123 as in FIG. 4, it is possible to return one or a list of similar items 126. The similar items in this response can either be filtered to include only similar items from within the core index 110, or the similar items can include similar items from the larger extended index 113. Those skilled in the art will understand appropriate similarity-ranking techniques to identify characteristics that warrant identifying an item as an item that is similar to an item sought in a query and suitable as an alternate for search. The recommendation filter input can be received from the user to control the search operation as desired.

Figure 6:
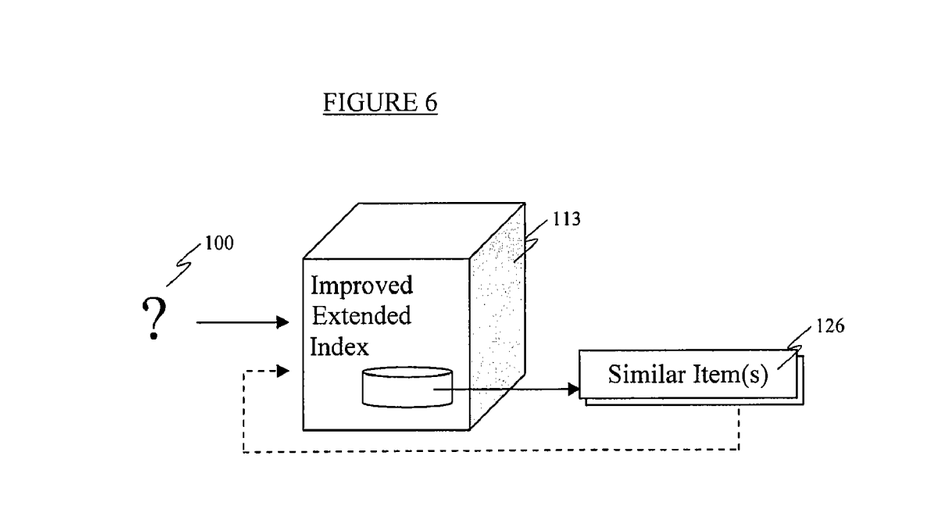
FIG. 6 is a flow diagram that illustrates operating on a query on an extended index to return related items.

Using the recommendation index 140, it is possible to take the list of similar items 126, issue queries for these items to the improved extended index 113, and find either all the matching items from the core index (such as the items 121 that can be located on a core index only search as depicted in FIG. 1B) or the list of similar items 126 related to each of those items (such as indicated in FIG. 4). This iterative process allows a person to navigate between related items, beginning with an initial query, until an available item is found. The iterative process is indicated in FIG. 6 by the dashed line. The recommendation filter input can be used to automatically execute the desired search operation, or the user can be queried before applying the alternate query item to a search.

The flow containing all the cases described above is depicted in FIG. 7. The initial query is directed against the improved extended index in the first operation 702. If there are no matches at 704, a negative outcome, then in step 706, the recommendation index is queried. If there are no similar items, another negative outcome, then a null result is returned at step 708. If there are similar items, an affirmative outcome at 706, the item or list of items are returned in step 710. If at the initial matching step 704 there are one or more matches within the extended index, an affirmative outcome at 704, then the operation of 712 is repeated for each item. If the item is within the core index, then at 714 the matched item is returned as the query result. If the item is not within the core index, and if only items within the core index are desired, then the dotted line path is taken from step 712 directly to step 716, where a "not in index" result is returned. If recommendations are desired for items not matched in the core index, a negative outcome at 712, then at step 718, the recommendation index is checked for the similar items (i.e., alternate query items). That is, a query comprising the matched similar item (rather than the original query) is directed against the recommendation index. If there are no related items found in the recommendation search, the "not in index" result is returned in step 716. If there are related items, those items are returned in step 720. Those skilled in the art will appreciate that the results generated in steps 720 and 716 can be combined into a single list or tree of results.

Figure 7:
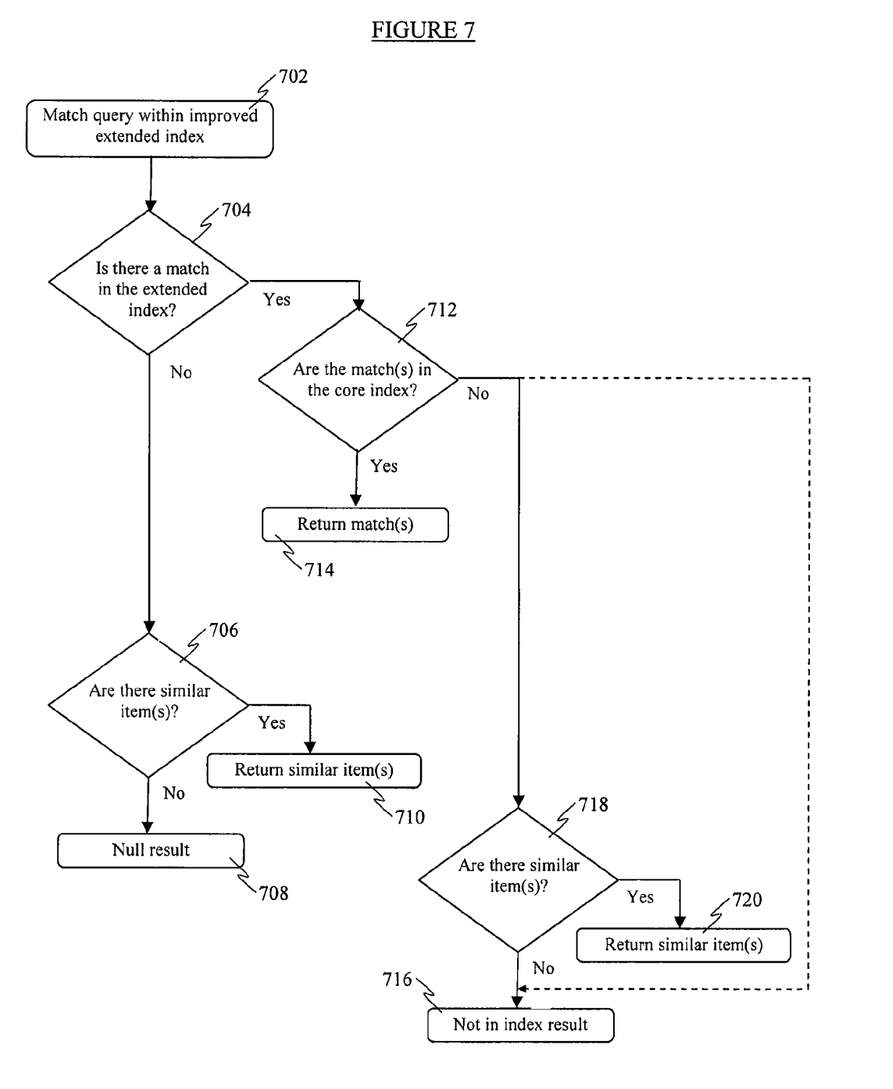
FIG. 7 is a flow diagram that illustrates the cases from FIGS. 1A, 1B, 1C, 4, and 6.

For example, consider the description above of a movie search with an extended index comprising the Amazon.com DVD offerings plus IMDb movie index, but this time including recommendations for similar movies. With this improved extended index, if Humphrey Bogart's first film, "The Harder They Fall" is not in the core index 110, the recommendation index 140 might suggest "The Big Sleep", a later Bogart film, or perhaps "On the Waterfront", an early Marlon Brando film that would be recommended to someone searching for "The Harder They Fall". If the recommendations are relevant (which can be produced via numerous, well-understood methods), then receiving such recommendations is far superior to receiving a "No match" or "Not in index" response.

If desired, a search facility constructed in accordance with the invention can provide a user with the option of selecting an extended search or the improved (recommendation) extended search above, so as to provide the various combinations of search output described above. In addition, the user can have the option of designating the core index and which supplemental meta indexes should be accessed as part of the extended search processing. Alternatively, the search facility can automatically access the additional supplemental index that will be used with extended searching. In this way, the facility can seek out indexes most likely to provide a match or to complement the user selected core index.

Figure 8:
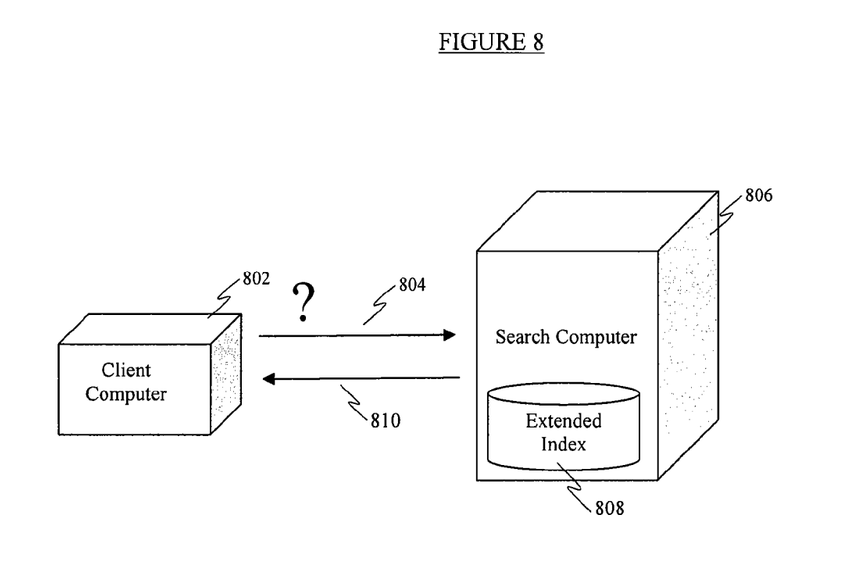
FIG. 8 is a block diagram representation of a client-search engine communication that takes place in accordance with the present invention.

FIG. 8 illustrates a computer-implemented search process in accordance with the present invention. FIG. 8 shows a client computer 802 at which a user submits a search query, represented by the question mark. The query is transmitted over a network communication path 804 and received at a computer 806 operating as a search engine or server. The search engine computer 806 includes a communications interface that receives the query from the client computer 802. The query-receiving search engine 806 processes the user query using an extended index 808 such as described herein. The search engine produces a query result 810, such as the multi-response indications described above, and returns the result to the user 802. Those skilled in the art will understand that the user computer 802 and search engine 806 can be implemented in the same computer, if desired. That is, a search query can be input directly to the search engine computer by a user via keyboard input and the like.

Computer operating instructions, such as computer program software, can be recorded on program product media that can be read by suitably configured computers and installed. In this way, a computer system executing the program instructions can perform a method for processing a query as described above. Upon installation, the suitably configured computers can execute the installed software and operate in accordance with the description herein to provide the disclosed features. In this way, a computer to be operated as a search engine that processes queries as described herein can be configured with software to perform the processing with extended index searching. Thus, a computer such as the search engine computer 806 illustrated in FIG. 8 can be configured with the operating software upon receiving the application program for installation. A variety of computing devices can operate as the search engine computer, including desktop, laptop, and server computers with appropriate user input, output, and network communications systems and peripherals.

The program product media for the computer program can comprise a wide variety of materials that used for program storage, including, for example, optical media such as CD or DVD data discs, semiconductor media such as flash memory devices, thumb drives, flash cards, external memory and storage devices, floppy disk media, and the like. Suitably configured computers such as the computer 806 of FIG. 8 will include systems for receiving the program product media, such as appropriate drives, USB ports, and other interfaces for receiving program product media. It should be apparent that such computers 806 also will be configured with appropriate network communications interfaces for communication with client computers to receive search queries.

The present invention has been described above in terms of presently preferred embodiments so that an understanding of the present invention can be conveyed. There are, however, many configurations for search processing systems not specifically described herein but with which the present invention is applicable. The present invention should therefore not be seen as limited to the particular embodiments described herein, but rather, it should be understood that the present invention has wide applicability with respect to search processing systems generally. All modifications, variations, or equivalent arrangements and implementations that are within the scope of the attached claims should therefore be considered within the scope of the invention.

What is claimed is:

1. A method of processing a query, the method comprising:
    directing the query to a query processing computer that directs the query against an extended index database, the extended index database comprising a core database and one or more supplemental indexes;
    determining if the query seeks a query item that is located within the core database and, if the query item is not located in the core database, then determining if the query item is located in one or more of the supplemental indexes;
    identifying at least one similar item in response to a determination that the query item was not located in the core database and was not located in at least one of the supplemental indexes, the at least one similar item comprising a suitable alternative for the query item in accordance with a similarity ranking of item characteristics based on predetermined item characteristic relations between the core database and the one or more supplemental indexes;
    directing an alternate item query against the extended index database, the alternate item query comprising a query that seeks the at least one similar item;
    returning a query result from the query processing computer, the query result comprising a response that indicates the query item is located in the core database, a response that indicates that the query item was not located in the core database but was located in one or more of the supplemental indexes, and a response that indicates that the query item was not located at all but that the similar item was located in either the core database or at least one of the supplemental indexes.

2. A method as recited in claim 1, wherein the extended index database includes a recommendation database that identifies one or more similar items that are suitable replacements for the item.

3. A method as recited in claim 2, wherein determining further includes repeating directing the query but with an alternate query item if determining indicates that one or more items from the recommendation database are suitable as alternate query items for the sought item.

4. A method as recited in claim 2, further including receiving a recommendation filter input that directs that the response should include only alternate query items from the core database.

5. A method as recited in claim 2, further including receiving a recommendation filter input that directs that the response should include alternate query items from the recommendation database.

6. A search facility system for processing a query, the system comprising:
   a query receiver that receives a query;
   an extended database processor that directs the received query against an extended database comprising a core database and one or more supplemental indexes, determines if the query seeks a query item that is located within the core database and, if the query item is not located in the core database, then determining if the query item is located in one or more of the supplemental indexes, wherein the extended database processor further identifies at least one similar item in response to a determination that the query item was not located in the core database and was not matched to an item in at least one of the supplemental indexes, the at least one similar item comprising a suitable alternative for the query item in accordance with a similarity ranking of item characteristics based on predetermined item characteristic relations between the core database and the one or more supplemental indexes, and directs an alternate query against the extended index database, the alternate item query comprising a query that seeks the at least one similar item, and returns a query result comprising a response that indicates the query item is located in the core database, a response that indicates that the query item was not located in the core database but was located in one or more of the supplemental indexes, and a response that indicates that the query item was not located at all but that a-the similar item was located in either the core database or at least one of the supplemental indexes.

7. A system as recited in claim 6, wherein the extended index database includes a recommendation database that identifies one or more similar items that are suitable replacements for the item.

8. A system as recited in claim 7, wherein the processor repeats directing the query, but with an alternate query item if it determines that one or more items from the recommendation database are suitable as alternate query items for the sought item.

9. A system as recited in claim 7, wherein the processor receives a recommendation filter input that directs that the response should include only alternate query items from the core database.

10. A system as recited in claim 7, wherein the processor receives a recommendation filter input that directs that the response should include alternate query items from the recommendation database.

11. A program product for use in a computer system that executes program instructions recorded in a computer-readable media to perform a method for processing a query, the program product comprising:
    a recordable media;
    program of computer-readable instructions executable by the computer system to perform operations comprising:
    directing the query against an extended index database, the extended index database comprising a core database and one or more supplemental indexes;
    determining if the query seeks a query item that is located within the core database and, if the query item is not located in the core database, then determining if the query item is located in one or more of the supplemental indexes;
    identifying at least one similar item in response to a determination that the query item was not located in the core database and was not located in at least one of the supplemental indexes, the at least one similar item comprising a suitable alternative for the query item in accordance with a similarity ranking of item characteristics based on predetermined item characteristic relations between the core database and the one or more supplemental indexes;
    directing an alternate item query against the extended index database, the alternate item query comprising a query that seeks the at least one similar item;
    returning a query result comprising a response that indicates the item is located in the core database, a response that indicates that the ~item was not located in the core database but was located in one or more of the supplemental indexes, and a response that indicates that the query item was not located at all but that a the similar item was located in either the core database or at least one of the supplemental indexes.

12. A program product as recited in claim 11, wherein the extended index database includes a recommendation database that identifies one or more similar items that are suitable replacements for the item.

13. A program product as recited in claim 12, wherein the determining operation further includes repeating directing the query but with an alternate query item if determining indicates that one or more items from the recommendation database are suitable as alternate query items for the sought item.

14. A program product as recited in claim 12, wherein the operation further includes receiving a recommendation filter input that directs that the response should include only alternate query items from the core database.

15. A program product as recited in claim 12, wherein the operation further includes receiving a recommendation filter input that directs that the response should include alternate query items from the recommendation database.

* * * * *